US012614135B2

(12) United States Patent
Rodemann

(10) Patent No.: US 12,614,135 B2
(45) Date of Patent: Apr. 28, 2026

(54) METHOD FOR IMPROVING AUTOMATED SCHEDULING, SCHEDULING SERVER AND SYSTEM FOR AUTOMATED SCHEDULING

(71) Applicant: Honda Motor Co., Ltd., Tokyo (JP)

(72) Inventor: Tobias Rodemann, Offenbach (DE)

(73) Assignee: Honda Motor Co., Ltd., Tokyo (JP)

( * ) Notice: Subject to any disclaimer, the term of this patent is extended or adjusted under 35 U.S.C. 154(b) by 136 days.

(21) Appl. No.: 18/512,029

(22) Filed: Nov. 17, 2023

(65) Prior Publication Data

US 2024/0169288 A1 May 23, 2024

(30) Foreign Application Priority Data

Nov. 18, 2022 (EP) .................................... 22208335

(51) Int. Cl.
| | |
|---|---|
| *G06Q 10/00* | (2026.01) |
| *G06Q 10/0631* | (2023.01) |
| *G06Q 50/00* | (2024.01) |
| G06Q 50/06 | (2012.01) |

(52) U.S. Cl.
CPC ................ *G06Q 10/063118* (2013.01); *G06Q 10/06311* (2013.01); *G06Q 50/06* (2013.01)

(58) Field of Classification Search
None
See application file for complete search history.

(56) References Cited

U.S. PATENT DOCUMENTS

2007/0282476 A1 12/2007 Song et al.
2018/0349858 A1* 12/2018 Walker ............... G06Q 10/1095

2019/0351783 A1* 11/2019 Goei ..................... B60L 53/665
2021/0078434 A1 3/2021 Goei et al.
(Continued)

FOREIGN PATENT DOCUMENTS

EP 4167156 A1 * 4/2023 ......... G06Q 10/0631
KR 101372695 3/2014

OTHER PUBLICATIONS

D. Semar, T. Chen and R. Hoda, "Automating SmartPhone Automation: Enhancing User Experience with Behaviour Learning," 2015 24th Australasian Software Engineering Conference, Adelaide, SA, Australia, 2015, pp. 108-117 (Year: 2015).*

(Continued)

*Primary Examiner* — Matheus Ribeiro Stivaletti
(74) *Attorney, Agent, or Firm* — JCIPRNET

(57) ABSTRACT

A method, scheduling server and system for improving automated scheduling are provided. The automated scheduling is at least partially based on user settings input by users includes: obtaining user settings for the users, the user settings defining user preferences and personal constraints of each user, obtaining system boundary conditions from a schedule goal and technical conditions to achieve a desired goal and calculating a schedule. The acceptance probabilities for alternative user settings are predicted. At least one alternative user setting is selected and an alternative schedule for each selected alternative setting is calculated. The alternative schedules are compared to the initially calculated schedule with respect to quality measure. After reading in the user's response to the suggested alternative setting another alternative setting is selected in case the user declined, or the systems proceeds with accepting the alternative setting as obtained user specific setting.

11 Claims, 2 Drawing Sheets

(56)                    References Cited

U.S. PATENT DOCUMENTS

| | | | |
|---|---|---|---|
| 2022/0036891 A1 | 2/2022 | Zweig et al. | |
| 2022/0327495 A1* | 10/2022 | Allison, III | ........ G06Q 10/1095 |
| 2024/0183668 A1* | 6/2024 | Turner | ............... G01C 21/3679 |

OTHER PUBLICATIONS

Pauline M. Berry et al., "PTIME: Personalized Assistance for Calendaring", ACM Transactions on Intelligent Systems and Technology, vol. 2, Issue 4, Jul. 2011, pp. 1-22.

Steffen Limmer, "Dynamic Pricing for Electric Vehicle Charging—A Literature Review", Energies, vol. 12, Issue 3574, Sep. 2019, pp. 1-24.

Makoto Ohara et al., "Parameter Adjustment Approach Based on Distribution of Schedules in the Past for Staff Scheduling Problems", 2016 5th IIAI International Congress on Advanced Applied Informatics, Jul. 2016, pp. 1103-1108.

"Search Report of Europe Counterpart Application", issued on May 15, 2023, pp. 1-9.

* cited by examiner

METHOD FOR IMPROVING AUTOMATED SCHEDULING, SCHEDULING SERVER AND SYSTEM FOR AUTOMATED SCHEDULING

CROSS-REFERENCE TO RELATED APPLICATION

This application claims the priority benefit of European Patent Application No. 22 208 335.4, filed on Nov. 18, 2022. The entirety of the above-mentioned patent application is hereby incorporated by reference herein and made a part of this specification.

BACKGROUND

Technical Field

The present invention concerns the problem of automating scheduling with an improved quality of the finally output schedule, in particular a method for improving automated scheduling, a scheduling server and system for automated scheduling executing the inventive automated scheduling.

Related Art

There are quite a number of different fields of application, in which a plurality of personal preferences and constraints, system capabilities and requirements of the addressed target need to be considered simultaneously. For less complex problems, this can be done by an operator who is aware of the different preferences of involved people, availability of technical equipment and the work that needs to be done as a target or goal for the schedule in the end. However, with increasingly more complex and diverse working styles, individual requirements tend to get more complex. Having in mind the trend towards mobile working, it is evident that certain employees might only be available for small parts of a week and, additionally, be limited to a low maximum hour limit a month. Thus, finding an optimal schedule that satisfies all preferences and constraints from both, personal as well as from technical, regulatory, and business side, is a challenging task. Happily, the improved performance in data processing and the increasing number of algorithms solving optimisation problems enable a higher degree in automation of solving such scheduling problems.

Nevertheless, it is still difficult enough to find a solution, which seems to be satisfying for all involved persons. Of course, it is possible to evaluate a plurality of different schedules with respect to each other, for example, with respect to a quality score or quality index, which can for example be a service level, an amount of money that has to be spent additionally to reach a desired service level, or the reduction in service level that results from implementing the respective schedule.

In the past, quite a number of approaches have been developed all trying to optimise a schedule starting from an input of involved persons, which can define their preferences and also obtaining knowledge about constraints caused by the task or goal for which the scheduling shall be performed, or the technical equipment needed.

For example Berry, P. M., Gervasio, M., Peintner, B., and Yorke-Smith, N. 2011. PTIME: "personalized assistance for calendaring" (ACM Trans. Intell. Syst. Technol. 2, 4, Article 40 (July 2011)) discloses a machine learning approach which is used to learn user preferences to automatically synchronise meetings. The model assumes that user preferences are specified using a user interface. However, these preferences are incomplete or conflicting. An interaction with the user over time is suggested in order to learn more precise user settings. This information is only used to propose options to all participants of the meeting who then have to negotiate and agree to a specific date and time of the meeting. Since the final decision for finding a date and time for the meeting involves a direct co-operation of the involved people, the suggested approach is unlikely to work with larger groups of people.

Further, systems are known that invite people to adapt in their definitions of the task such as their charging requirements. One such approach can be found in S. Limmer. "Dynamic pricing for electric vehicle charging—a literature review" (Energies, 12(18):3574, 2019). Here it is tried to motivate users to adapt their charging requirements using price incentives.

US20070282476A1 discloses a workflow scheduling system, such as a computer system, used to coordinate and schedule tasks in complex scheduling environments. The system accepts incoming orders and dynamically schedules them according to the constraints of the resources required for the order and any constraints of the orders themselves. The suggested system computes and ranks multiple schedules according to some quality measure. Different schedules employ different combinations of alternative resources like different nurses with the same skills or different x-ray scanners. Alternative schedules are therefore based on flexibilities of the system known in advance.

Another example for learning user preferences over time is described in Makoto Ohara, Hosashi Tamaki: "Parameter Adjustment Approach Based on Distribution of Schedules in the Past for Staff Scheduling Problems".

However, there is still the problem that the known systems rely on information which is collected upfront or that starting from an actual user behaviour, the preferences are determined over time. So, in case that the users do not recognise themselves that by inputting information about their own flexibility or information on more strict and less strict requirements, the systems may never identify potential improvements requiring a deviation from the collected or learned settings.

SUMMARY

The present invention to improve known scheduling algorithms. The problem is solved by the subject matter as claimed in the independent claims. The dependent claims define advantageous aspects of the present invention.

The present invention concerns a method for improving automated scheduling, a scheduling server executing the steps of the method, and a scheduling system including the scheduling server and means for communicating with involved persons. According to method, the automated scheduling is at least partially based on user settings input by a plurality of users. First, before an initial schedule is calculated, user settings for a plurality of users are obtained. These settings define individual user preferences and personal constraints of each user. In order to input such user preferences and constraints (commonly referred to as "user settings") any kind of communication method may be used that is capable of transferring the information input by the user to a server, in which the collected information is then further processed. Thus, one may think of mobile devices for inputting the preferences and constraints by a user, like, for example, smartphones on which respective applications runs, which allow the user to communicate with a central server (or even a distributed server system) in order to input information on desired user settings. Further, system boundary conditions are obtained. Such system boundary conditions comprise external requirements that need to be satisfied in order to successfully implement a schedule for addressing the schedule goal.

Such external requirements can be caused either by the task that is desired to fulfilled or the goal that shall be achieved or, in case that technical systems are involved in achieving such a goal, also limitations caused by technical systems like availability of tools and the like.

So far, the method and system suggested corresponds to systems that are known in the art. Starting from the obtained settings defined by the system boundary conditions and the user preferences and constraints (user settings), the scheduling problem is formulated, and an initial solution to this scheduling problem is calculated. This calculated schedule is denoted initial schedule, and later on used as a reference schedule for analyzing alternatives with respect to this reference schedule. For solving the formulated scheduling problem, standard approaches like for example linear programming (LP), heuristic approaches like local neighbourhood search (LNS), or evolutionary algorithms (EAs) or the like can be used.

For real scenarios, it is evident that the people involved in the schedule to be calculated are not always willing or able to provide all information regarding their flexibility to each and every preference or constraint. According to the present invention, the method now predicts acceptance probabilities for alternative user settings, which are settings differing from the settings in put by the users. Starting from the preferences as defined by the users by their initial input, such alternative settings are considered, and for these alternative settings a probability that a user might accept such deviation from his input preference or constraint is calculated as an acceptance probability. For each alternative setting, an acceptance probability is predicted. Once there are predicted acceptance probabilities for the alternative settings, at least one of these alternative user settings is selected and an alternative schedule is calculated for each of these selected alternative settings. Thus, in case that a plurality of alternative user settings is selected, also a plurality of alternative schedules is calculated. These alternative schedules are then evaluated compared with respect to the initial schedule in order to determine whether an improvement or deterioration is achieved by altering a user setting from the initially obtained user settings to the selected alternative setting. One possibility to select those alternative user settings for the selection, their individual acceptance probability might be considered, for example by choosing all alternative user settings having an acceptance probability above a certain threshold or a certain total number of alternative user settings with the highest acceptance probability.

Based on the result of this evaluation and the predicted acceptance probabilities, an alternative setting is determined which is then suggested to the user whose setting is concerned by the alternative setting and, thus, the respectively evaluated alternative schedule. The suggestion can, for example, be made using the app through which the user initially inputted his preferences and constraints. Using this app, the suggestion for the alternative setting is made to the user and the system proceeds depending on the reaction of the user which is read in by the scheduling server.

The user might decline the suggested alternative setting. In that case, the system proceeds by selecting another alternative setting. In case that the user does not react at all, because he does not recognise that the suggestion was made or he is not willing to co-operate, or the user is less flexible than predicted, it might be assumed that the user declined the suggested alternative setting.

Alternatively, in case that the user accepts the suggested alternative setting, this alternative setting is considered to be a new user setting, and based on this new user setting the procedure is repeated. This means that a new reference schedule is determined and, based on further alternative user settings, alternative schedules are calculated and evaluated as mentioned above with respect to the new reference schedule. The identification of alternative user settings and calculated alternative schedules is repeated until a stop criterion is met. Such a stop criterion could for example be that for all remaining alternative settings, no (or no sufficient) further improvement of the final schedule can be achieved or no further alternative user setting can be identified, which has an acceptance probability lying above a minimum threshold. The finally achieved schedule is then applied or output for further processing. In case that only technical systems are involved, the schedule can directly be used in order to control the system. In case that people are involved, the final schedule is output to the users so that the user has knowledge about the finally achieved schedule and can act accordingly.

According to one aspect of the present invention, the prediction of acceptance probabilities is based on at least one of the user's behaviour history, previous acceptance rate of suggested alternative user settings, user input information and general domain knowledge. In case that the user's behaviour history shall be analysed in order to predict an acceptance probability for a certain preference or constraint, it is necessary to observe and log information on actual user behaviour in the past. In case that the acceptance rate of a specific user shall be analysed, it is necessary to record suggestions made to the user and the user's reaction. It is also possible to include information input by the user regarding his flexibility into the prediction of an acceptance probability. For example, the user might from time to time input his general flexibility, which is then used in order to predict an acceptance probability for each of his defined preference and constraint. Further, general domain knowledge may also be used in order to determine a user's flexibility. For example, experience of an operator of a system may say that in most cases it is possible that the user accepts a delay of the starting time of charging session for up to 30 minutes. Such general domain knowledge may come from the operator' experience and observation in the past and may be input manually by the operator of the system.

The determination of the alternative setting which is used in first place in order to communicate request users whether they accept a change in their settings in order to achieve an overall improvement of the schedule may first determine which alternative settings have an acceptance probability above a certain threshold. Then, from these alternative settings with an acceptance probability above a certain threshold, the setting achieving the greatest quality measure improvement is determined. Alternatively, the alternative user settings may be ranked by their respective acceptance probability, and a predefined number of the top ranked alternative user settings is selected.

Generally, as a quality measure improvement any kind of subjective or objective measure may be considered which can be calculated from a metric involving the initial schedule as the reference, and the alternative schedules. As stated above, only those alternative schedules are considered for which the acceptance probability of the underlying alternative setting exceeds a certain threshold. It may even be considered to adapt the threshold in consideration of the number of alternative settings that can be identified. For example, if the number of alternative settings is below another threshold, the threshold for the acceptance probability might be adapted, in the given case for example lowered, in order to obtain an increased number of alternative settings that might be considered.

Further, in order to avoid that the users are bothered by being requested to accept an alternative setting, in the determination of alternative settings for which a communication with a user is started, an inconvenience measure for the users might be considered. Such inconvenience measure is an indicator for the disturbance or bothering of the user by a certain request. One example that might be used as an indicator is that the number of requests to a certain user is counted and in case that the number of requests per time exceeds a request rate threshold, additional requests are blocked independent from a potential improvement, or weighted with such an improvement. This means that the higher the improvement is, the higher the threshold for any inconvenience measure might be that leads to dismissing a request for this particular alternative user setting.

In such a case, it is particularly advantageous, if the inconvenience measure is accumulated over time. This ensures that even for a longer time horizon it is avoided that the user will be bothered by being asked by the system for a possible adaptation of the settings so that in the end such a user might even quit participating in the system. So, the inconvenience measure may cover two aspects: first, it is an indication, for a single event, how big the impact for a user is. For example, shifting the starting time to another day of the week may be more significant (higher inconvenience measure) for the user than shifting the starting time only for half an hour. Further, as mentioned above already, repetitively requesting the same user might be annoying for the user even in case that the inconvenience for a single event is low. Thus, each additional request to a specific user will result in increasing the overall inconvenience measure for this user.

The invention will now be described with reference to the attached drawings in which a preferred example for the system, its server and the method is illustrated with reference to a particularly preferred application area. It is to be noted that the explanations given below shall only further explain the implementation of the system and method without limiting the subject matter claimed. The invention is defined in the appended claims, and the dependent claims concern aspects of a particular improvements and preferred embodiments.

BRIEF DESCRIPTION OF THE DRAWINGS

The aspects and implementation of the present disclosure will be explained in the following description of specific embodiments in relation to the enclosed drawings, in which.

DETAILED DESCRIPTION

As it was mentioned above, the present invention will now be explained with reference to a charging system. Of course, this has to be understood only as one preferred embodiment for implementing and applying the present invention. Further examples may be traditional personal scheduling or similar problems like scheduling usage of equipment for employees. For the latter case, it is particularly evident that there are boundary conditions for the system, which cannot be influenced by the participating people. For example, the number of available tools and machines that are needed in order to implement the finally achieved schedule is an external requirement (system boundary condition), as well as timing of certain activities that may be required to match soft or hard deadlines or milestones in a development process, for example. Further, instead of the example of a charging system and, thus, charging activity, the same problem arises with refuelling activities, where the users (customers) can make reservations in advance. For charging or refuelling systems that use prior reservation from the customers, these activities need to be scheduled to optimally match customer preferences but also consider technical limitations like peak electricity loads, maintenance demand, or fuel availability. In addition, the timing of such an activity might have further adverse effects: loud noise in the morning hours, increased energy costs during peak cost times, etc. these effects, may be taken into consideration by defining respective further external requirements (system boundary conditions), for example, a reduced threshold for noise in the morning hours, or the like.

Figure 1:
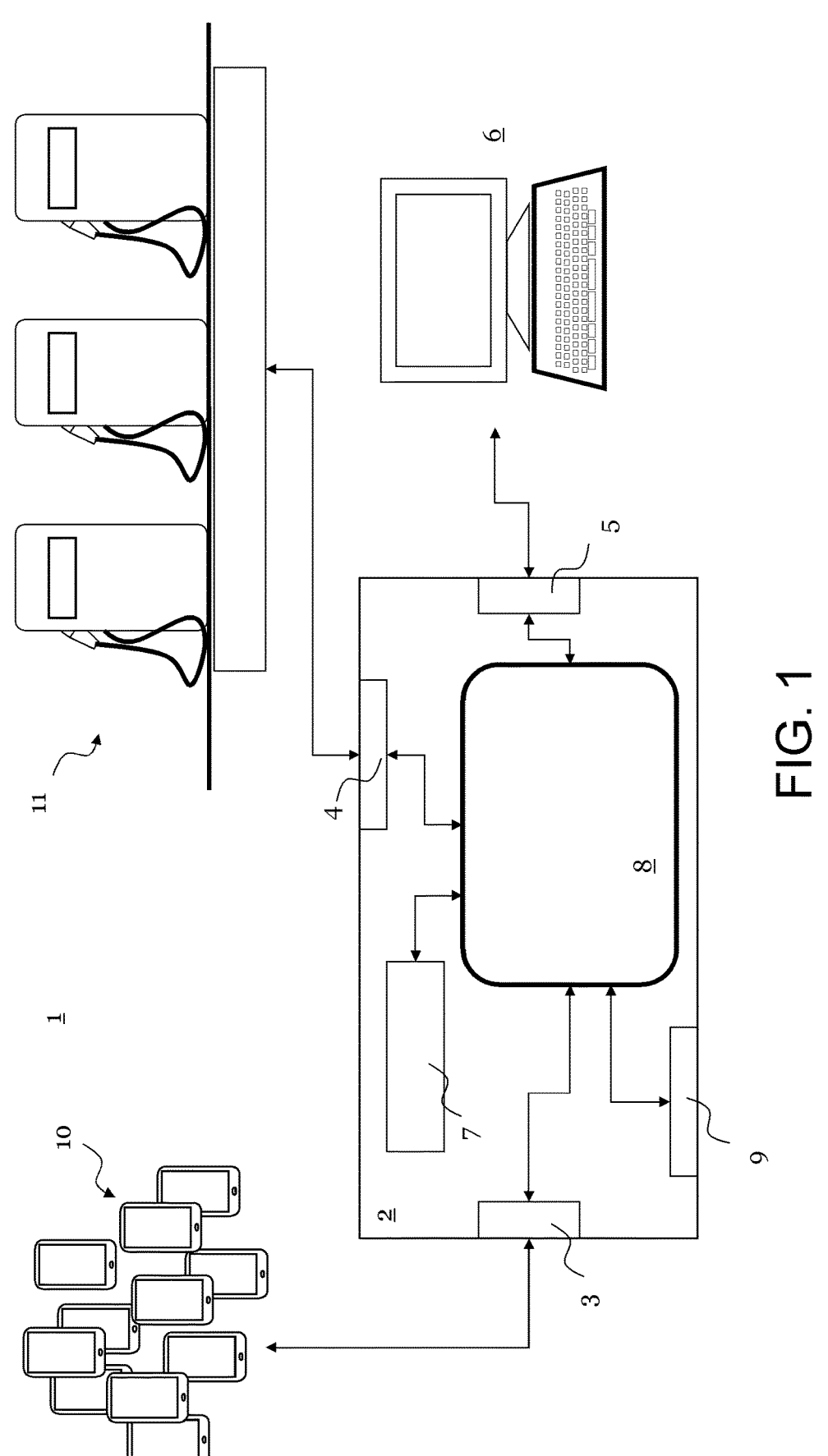
FIG. 1 shows a block diagram of a system including a server according to the present disclosure using as an example a charging system.

FIG. 1 shows a system 1 with a single scheduling server, which collects all the necessary information in order to apply the inventive method and to output finally an optimised schedule. Of course, instead of using a single server, which is illustrated for facilitating understanding of the present invention, it is also possible to use cloud computing or a plurality of connected servers. It is to be noted again, that the basic calculation of the schedule starting from a set of user input preferences and constraints (user preferences and constraints but also external requirements) is generally known in the art. Thus, only for completeness of explanations and illustration, a respective system is shown as an example. It is important that the present invention is about estimating (predicting) the flexibility of certain users with respect to at least one or even a plurality of their settings input into the system up front. This flexibility is estimated in order to be no longer bound to the information input by the users, which might be incomplete or at least not as precise as desired.

Generally, the users participating in the system input their preferences and constraints as user settings via an interface 3 to the scheduling server 2. The scheduling server 2 comprises a memory 7, in which for each user or each user account the input user settings are stored. The user interface 3 is connected with the memory 7, which is a non-volatile memory, via a processor 8. The processor 8 is configured to organise and execute communication with the users via the user interface 3 in a commonly known way, for example, using applications running on smart phones 10 of the users.

A system interface 4 is used in order to obtain information on the system boundary conditions as external requirements, which, in the present case may be caused by the charging system 11. As it is illustrated in FIG. 1, the number of available charging stations is significantly lower than the number of participating users who might need charging their electric vehicles from time to time. Thus, all the technical limitations that are caused by the involved charging system 11 are input into the system using the system interface 4.

In the present case, a single processor 8 is illustrated. However, the plurality of processors may be used that commonly execute the necessary calculations. It is also possible that each of such plurality of processors is connected to one of the interfaces 3, 4 in order to organise and execute communication with external parties such as the users or the charging system 11. A further interface 5 is used in order to connect the server 2 to an operator, which is in the illustrated embodiment shown as a computer system 6. Via such computer system 6, an operator of the system 1 may be able to manually interfere with selections made by the system 1 or with defining thresholds for the automated selection and determination of alternative settings or alternative schedules. The computer system 6 may particularly be used in order to input domain knowledge in order to predict acceptance probabilities for specific user settings, as it will be explained later.

Finally, an output interface 9 is connected to the processor 8 in order to deliver the result, namely the final schedule to additional parties, if necessary. Usually, the final schedule will be output via the user interface 3 to the smartphones 10, and, in case that an adaptation of the charging system 11 (for controlling charging parameters for example) is necessary, also to the backbone of the charging system 11.

Figure 2:
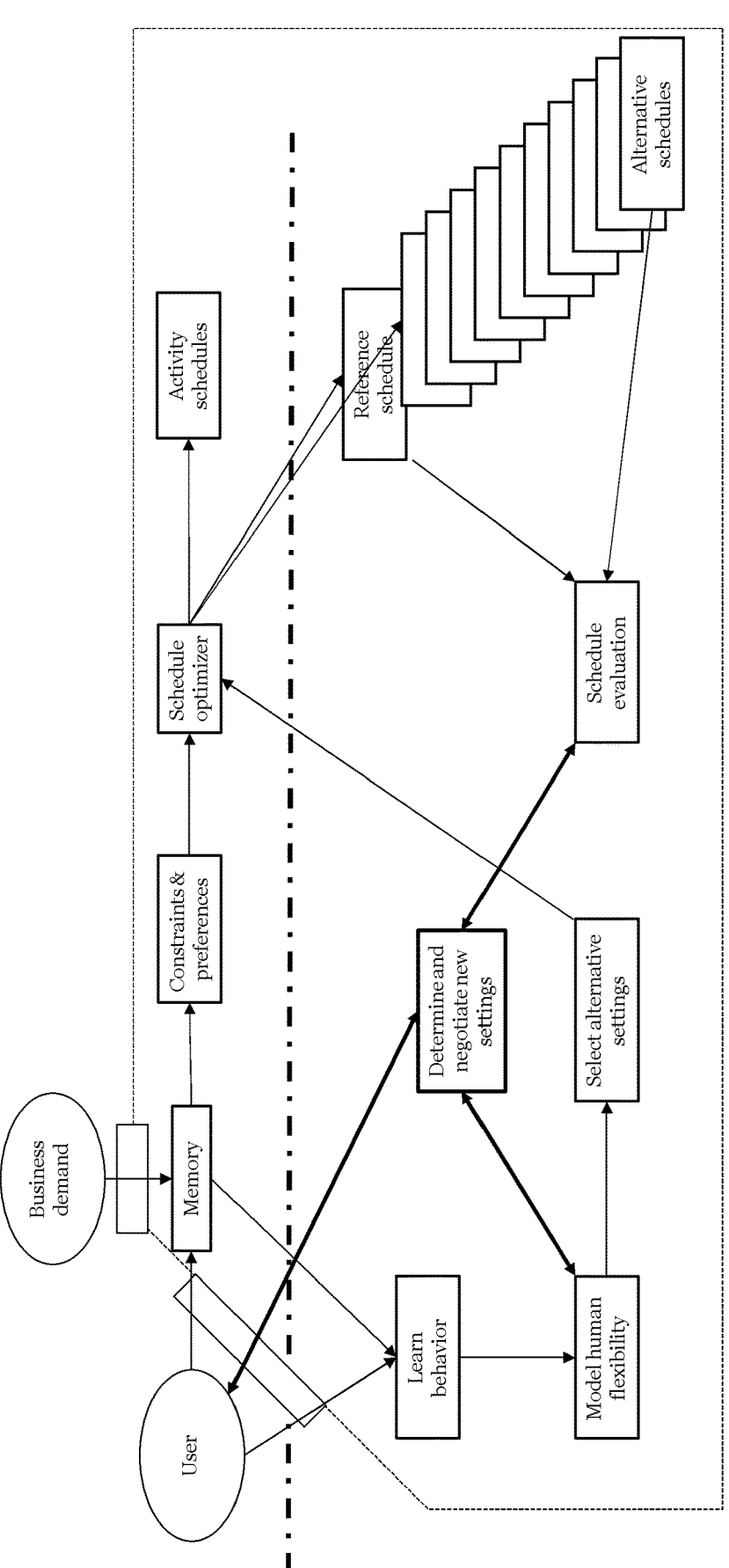
FIG. 2 shows the overall structure of the method using the charging system illustrated in FIG. 1.

The operation of the system 1 as illustrated in FIG. 1 will now be explained with reference to FIG. 2.

As it was explained above, before calculation of any schedule is possible, the users, using their smart phones 10 having an app running thereon, input their preferences and constraints as user settings. The preferences and constraints are stored in the memory 7. Additionally, a business demand (defining at least part of the system boundary conditions) is input via the system interface 4, and the respective settings are also stored in the memory 7. In the next step, before any calculation of a schedule regarding the goal, for which the schedule shall be calculated, can be performed, all settings (user preference, user constraints and external constraints) are obtained by the processor 8 from the memory 7. Based on this information, an initial schedule is calculated, taking the settings as provided by the user and as obtained from by the system as a fixed input. This initial schedule is also called "reference schedule" as it is later on used for the evaluation of alternatives.

In commonly known systems, this initial schedule would be output as a so-called activity schedule. Thus, the calculation of first, initial schedule or reference schedule can be executed as it is known from the state of the art. This is illustrated by the dashed and dotted line separating an upper half corresponding to commonly known systems, and the lower part, which concerns the extension of known systems according to the present invention.

The central aspect of the present invention is that the user preferences and constraints (or user settings) are not considered to be fixed. As mentioned above already, the settings are often input by the users in an imprecise or incomplete way. This leads to calculation of the initial schedule (which is the only schedule calculated in the state of the art) based on input parameters that may have different values which could lead to a drastically improved schedule quality. The idea of the present invention is now to consider a certain flexibility of the user settings in order to determine whether an improvement of the final schedule might be achieved in case that a user accepted the change of his settings.

So once an initial schedule or reference schedule is calculated as explained above, a variation on the user settings is performed. Generally, every user setting might be varied in order to calculate alternative schedules based thereon. However, this would lead to an incredible amount of potential alternative schedules that would need to be calculated. Thus, it is first estimated, which changes in the user settings might be accepted by the users. Thus, the user behaviour is at first investigated to learn the behaviour of the users, which might lead to the conclusion, which changes or which alternatives of settings might be accepted by the respective user. From the learned behaviour, a model of the human flexibility is calculated and, based on the model, alternative settings are selected, which form the basis for the calculation of the alternative schedules.

For each user setting, which might potentially be changed, an acceptance probability is predicted. This acceptance probability is a measure how likely it is that the user may accept such a change of his initially input setting in case that he was requested to do so. It is therefore an estimation of the flexibility of the user regarding the specific setting. This estimation can for example be based on past time periods (e.g., a user accepting charging sessions on e.g., Tuesday on several occasions in the past), or on general domain knowledge, which usually an operator of the system has. For example, the operator of the system might have observed that in most cases charging on a different weekday is acceptable, if the delay is less than three days. Such knowledge could be input for example via the operator interface 5 and the computer 6. The flexibility may also be derived from a user input directly, in case that the user provides additional information on flexibility directly. For example, the user might input into the system the information that normally Sunday is also okay, but not optimal. So, in case that he also inputs a preference that he desires to recharge his electric vehicle on Saturday, the system has knowledge that an alternative reservation on Sunday would be likely to be accepted by the user.

Further, it is also possible that initially it is assumed that all users are flexible for a setting like for example starting time (probability=100%) and the predicted acceptance probability for such a type of change request is halved every time the user rejects the request to change. In case of several equally likely requests, a random selection can be made. The system would then select a certain, predefined number of alternative user settings, having the highest probabilities and recalculate the schedule optimisation for each alternative setting in order to calculate the alternative schedules. It is to be noted that the recalculation of the alternative settings based on other values for the user settings (alternative user settings) is done in the very same way as the initial calculation of the reference schedule, only using the variation of user settings, namely the alternative settings.

Once the alternative schedules have been calculated, an evaluation is conducted in order to identify a specific alternative schedule, or a plurality of alternative schedules, for which it can be recognised that an improvement with respect to the reference schedule is achieved. This evaluation is done based on a quality measure, which can be any indicator that can be calculated for each of the alternative schedules with reference to the reference schedule. For example, a cost function for an enquiry consisting of two terms can be computed: $C\_enquiry=C\_user-w*C\_system$, where $C\_user$ is the cost to the user, for example the probability to reject the request $P\_reject$, and $C\_system$ is the reduced overall system cost achievable with the modified request (for example, the cost savings in Euro). The weighting factor $w$ is selected manually in order to balance the interests of users and system operator, and can be set via the computer system 6 and the operator interface 5. If $C\_enquiry$ is above a predefined threshold, the process would be stopped and no users contacted.

The determination which alternative user setting is suggested to the respective user is done based on the comparison of the quality measure of the alternative schedule with respect to the reference schedule but also taking into consideration the predicted acceptance probability. This means, that at first, for example, the alternative setting leading to an alternative schedule with the most significant improvement is identified. Then, for this alternative setting, the acceptance probability is checked, whether it lies above a minimum threshold. Using such a minimum threshold for the acceptance probability ensures that unnecessary requests to users are avoided. Apart from reducing the overall time until the final schedule can be achieved, this also reduces the requests forwarded to the users, which might be annoying for the users. It is evident, that the sequence for determining the alternative user settings may be the other way round: so first, all user settings having an acceptance probability lying above the minimum threshold are identified and then, the alternative user setting is determined for which the improvement has the greatest effect.

Further, the inconvenience caused for user can be estimated. This can be done for example by counting how often a user has already been requested to accept an alternative user setting. In such a case, although the general acceptance probability of a certain user setting would be high, it is avoided to forward such a request to a user in order to stop bothering a particular user. This could be achieved for example by ranking the alternative user settings by their acceptance probability weighted with the inconvenience measure of the user. This inconvenience measure could be the same for a plurality of settings associated with the same user. The inconvenience measure may be determined for example based on a frequency of requests received or a request rate for the specific user.

Once a particular alternative user setting has been identified, for which above conditions are fulfilled, a suggestion for such an alternative user setting is forwarded via the user interface 3 to the smart phone 10 of the user. The user still has the option to decline accepting such an amended user setting. In that case, the system would dismiss this particular user setting and proceed by determining whether the alternative uses setting leading to next best solution could be forwarded and suggested to the user. This may be the same user as before or another user.

In case that the user accepts, the reference schedule would be updated accordingly. This means, that the accepted alternative user setting is then considered to represent a user setting and the calculation of the schedule as it was performed initially is repeated in order to calculate a new reference schedule. Thereafter, the same procedure as explained above will be repeated. This means that again a plurality of alternative user settings is identified and alternative schedules are compared with the new reference schedule in order to determine whether a further improvement might be achieved. In that case, a further alternative user setting is identified, just the same way as explained above, and eventually suggested to a user (of course, again only in case that the other conditions for determining and forwarding such a request to a user are fulfilled, as explained above).

This procedure is repeated until a stop criterion is met. Such a stop criterion could be, for example, that the improvement that is achieved falls below a threshold where it is not worth bothering the users, no more alternative user settings can be identified for which an acceptance probability lies above a certain threshold or the inconvenience that is estimated for the users exceeds a certain threshold so that, independent from a possible improvement of the final schedule, it is considered not worth it to bother the users. Other stop criteria, or a combination of the mentioned criteria, may be thought of.

Once the stop criterion is reached, the last calculated reference schedule is used as the final schedule and is output to the users or to any other external entity, which requires the schedule for further processing or control of involved technical equipment.

The suggested method, which significantly improves the quality of the finally output and applicable schedule may even be further improved by providing an incentive signal together with the suggested alternative uses setting to a user. For example, the user could receive a given share of the expected savings and by making the change from the initially provided user preferences and constraints. Such an incentive could also be enhanced for a user that already had contributed in the past. The enhancement could be the bigger, the more the contribution of the user was.

The inconvenience measure for a user through being asked to adapt his settings or to actually act according to an alternative setting, could be based on a generic human psychological model, be negotiated within the company, or learned for each user depending on feedback collected after the request.

What is claimed is:

1. A method for improving automated scheduling of charging sessions executed in a system including a charging system for electric vehicles, wherein the automated scheduling is at least partially based on user settings input by a plurality of users, comprising the following steps:
   obtaining, via a user interface, user settings for the plurality of users, the user settings defining user preferences and personal constraints of each user;
   obtaining, via a system interface, system boundary conditions derived from a schedule goal and technical conditions of a technical equipment of the charging system involved to achieve a desired goal that shall be achieved by applying a schedule to be determined;
   calculating, by at least one processor, the schedule by solving a scheduling problem specified from a combination of user specific settings and the system boundary conditions;
   predicting, by the at least one processor, acceptance probabilities for alternative user settings, which are settings differing from the obtained user settings;
   selecting, by the at least one processor, at least one alternative user setting and calculating an alternative schedule for each selected alternative user setting;
   evaluating, by the at least one processor, the calculated alternative schedules and an initially calculated schedule with respect to a quality measure in order to determine an improvement or deterioration for each alternative schedule;
   determining, by the at least one processor, based on a result of an evaluation and the predicted acceptance probabilities, an alternative setting to be suggested to a user whose user setting is concerned by the alternative setting;
   reading in, by the at least one processor, a user's response to the suggested alternative setting via the user interface and selecting another alternative setting in case the user declined, or proceeding with accepting the alternative setting as obtained user specific setting and repeating calculation of a schedule, selection of alternative settings, calculation of alternative schedules, evaluation and selecting and suggesting an alternative user setting and reading in of the user's response, until a stop criterion is met;

outputting, via an output interface, a last calculated schedule to the plurality of users and to the charging system for controlling charging parameters of the charging system for charging the vehicle vehicles, wherein the last calculated schedule adapts charging parameters of the charging system; and controlling, by the charging system, the technical equipment using the output last calculated schedule for directly controlling charging sessions of a plurality of charging stations based on the adapted charging parameters regarding technical limitations including at least one of peak electricity loads and peak energy costs.

2. The method according to claim 1, wherein prediction of the acceptance probabilities is based on at least one of a user's behavior history, a previous acceptance rate, user input information, and general domain knowledge.

3. The method according to claim 2, wherein the method determines from the alternative user settings having an acceptance probability above a set threshold the one with a greatest quality measure improvement.

4. The method according to claim 1, wherein the method determines from the alternative user settings having an acceptance probability above a set threshold the one with a greatest quality measure improvement.

5. The method according to claim 4, wherein the method estimates an inconvenience measure for the users and takes the inconvenience measure for determination of the alternative user setting to be suggested into account.

6. The method according to claim 4, wherein the selection prioritizes for suggesting an alternative user setting of a user having a lower inconvenience measure.

7. The method according to claim 6, wherein the inconvenience measure is accumulated over time.

8. The method according to claim 1, wherein the method estimates an inconvenience measure for the users and takes the inconvenience measure for determination of the alternative user setting to be suggested into account.

9. The method according to claim 8, wherein the inconvenience measure is accumulated over time.

10. A system including a scheduling server for improving automated scheduling of charging sessions in a charging system for electric vehicles, and the charging system, wherein the automated scheduling is at least partially based on user settings input by a plurality of users, wherein the scheduling server comprises a user interface, a system interface, at least one processor, and an output interface, wherein the user interface is configured to obtain user settings for the plurality of users, the user settings defining user preferences and personal constraints of each user, wherein the system interface is configured to obtain system boundary conditions derived from a schedule goal and technical conditions of a technical equipment of the charging system involved to achieve a desired goal that shall be achieved by applying a schedule to be determined, wherein the at least one processor is configured to:

calculate the schedule by solving a scheduling problem specified from a combination of user specific settings and the system boundary conditions;

predict acceptance probabilities for alternative user settings, which are settings differing from the obtained user settings;

select at least one alternative user setting and calculating an alternative schedule for each selected alternative user setting;

evaluate the calculated alternative schedules and an initially calculated schedule with respect to quality measure in order to determine an improvement or deterioration for each alternative schedule;

determine, based on a result of an evaluation and the predicted acceptance probabilities, an alternative setting to be suggested to a user whose user setting is concerned by the alternative setting; and read in a user's response to the suggested alternative setting and select another alternative setting in case the user declined, or proceed with accepting the alternative setting as obtained user specific setting and repeating calculation of a schedule, selection of alternative settings, calculation of alternative schedules, evaluation and selecting and suggesting an alternative user setting and read in of the user's response, until a stop criterion is met, wherein the output interface is configured to output a last calculated schedule to the plurality of users and to the charging system for controlling charging parameters of the charging system for charging the electric vehicles, wherein the last calculated schedule adapts charging parameters of the charging system, and wherein the charging system is configured to control the technical equipment using the output last calculated schedule for directly controlling charging sessions of a plurality of charging stations based on the adapted charging parameters regarding technical limitations including at least one of peak electricity loads and peak energy costs.

11. A system for improving automated scheduling comprising the scheduling server according to claim 10 and a user communication interface for outputting a request generated by the scheduling server and concerning an alternative user setting to a user.

* * * * *